(12) United States Patent
Westbrook

(10) Patent No.: US 10,635,101 B2
(45) Date of Patent: Apr. 28, 2020

(54) METHODS AND SYSTEMS FOR PREVENTING AN AUTONOMOUS VEHICLE FROM TRANSITIONING FROM AN AUTONOMOUS DRIVING MODE TO A MANUAL DRIVING MODE BASED ON A RISK MODEL

(71) Applicant: HONDA MOTOR CO., LTD., Minato-ku, Tokyo (JP)

(72) Inventor: Shaun Westbrook, Los Angeles, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 85 days.

(21) Appl. No.: 15/682,156

(22) Filed: Aug. 21, 2017

(65) Prior Publication Data
US 2019/0056731 A1 Feb. 21, 2019

(51) Int. Cl.
*G05D 1/00* (2006.01)
*G05D 1/02* (2020.01)

(52) U.S. Cl.
CPC .......... *G05D 1/0061* (2013.01); *G05D 1/0055* (2013.01); *G05D 1/0214* (2013.01); *B60W 2540/30* (2013.01); *G05D 2201/0213* (2013.01)

(58) Field of Classification Search
CPC .. G05D 1/0061; G05D 1/0055; G05D 1/0214; G05D 2201/0213; B60W 2540/30
See application file for complete search history.

(56) References Cited

U.S. PATENT DOCUMENTS

| | | | |
|---|---|---|---|
| 8,823,530 B2* | 9/2014 | Green | B60K 28/06 180/272 |
| 9,582,080 B1* | 2/2017 | Tilton | G06F 3/017 |
| 9,646,428 B1* | 5/2017 | Konrardy | H04W 4/90 |

(Continued)

FOREIGN PATENT DOCUMENTS

| | | |
|---|---|---|
| JP | H062979383 A | 10/1994 |
| JP | 2016-182952 A | 10/2016 |

(Continued)

OTHER PUBLICATIONS

Sheng et al., "An Integrated Manual and Autonomous Driving Framework based on Driver Drowsiness Detection", IEEE/RSJ International Conference on Intelligent Robots and Systems (IROS), pp. 4376-4381, Nov. 3-7, 2013, Tokyo, Japan.

(Continued)

Primary Examiner — Behrang Badii
Assistant Examiner — Daniel L Greene
(74) Attorney, Agent, or Firm — Arent Fox LLP

(57) ABSTRACT

Systems and methods for preventing an autonomous vehicle from transitioning from an autonomous driving mode to a manual driving mode based on a risk model. The system includes a memory that stores instructions for executing processes for preventing the autonomous vehicle from transitioning the autonomous driving mode to the manual driving mode from based on a risk model. The system also includes a processor configured to execute the instructions. The instructions cause the processor to receive physiological data from a sensor, generate a risk assessment profile based on the physiological data, control an operating mode of the autonomous vehicle based on the risk assessment profile.

20 Claims, 4 Drawing Sheets

(56) References Cited

U.S. PATENT DOCUMENTS

| | | | |
|---|---|---|---|
| 9,731,726 B2* | 8/2017 | Gordon | B60W 40/08 |
| 2004/0117098 A1 | 6/2004 | Ryu et al. | |
| 2005/0115561 A1* | 6/2005 | Stahmann | A61B 5/0031 |
| | | | 128/200.24 |
| 2010/0109881 A1 | 5/2010 | Eskandarian et al. | |
| 2010/0173689 A1* | 7/2010 | Ansari | G07F 17/3237 |
| | | | 463/16 |
| 2012/0179008 A1 | 6/2012 | Burton | |
| 2014/0051044 A1* | 2/2014 | Badower | A61B 5/7203 |
| | | | 434/236 |
| 2014/0317005 A1* | 10/2014 | Balwani | G06Q 10/0832 |
| | | | 705/317 |
| 2014/0347458 A1* | 11/2014 | Tijerina | G06K 9/00369 |
| | | | 348/77 |
| 2016/0001781 A1* | 1/2016 | Fung | B60W 40/08 |
| | | | 701/36 |
| 2016/0031479 A1 | 2/2016 | Fung et al. | |
| 2016/0176409 A1 | 6/2016 | Kirsch et al. | |
| 2016/0355190 A1 | 12/2016 | Omi | |
| 2017/0028995 A1 | 2/2017 | Mori et al. | |
| 2017/0042439 A1* | 2/2017 | Yeow | G16H 10/60 |
| 2017/0057507 A1* | 3/2017 | Gordon | B60W 30/16 |
| 2017/0090475 A1 | 3/2017 | Choi et al. | |
| 2017/0108864 A1* | 4/2017 | Wiklinska | G06N 5/022 |
| 2017/0110022 A1* | 4/2017 | Gulash | G09B 9/052 |
| 2017/0318360 A1* | 11/2017 | Tran | H04Q 9/00 |
| 2017/0367651 A1* | 12/2017 | Tzvieli | A61M 21/02 |
| 2018/0065642 A1* | 3/2018 | Frye | B60W 40/08 |

FOREIGN PATENT DOCUMENTS

| | | |
|---|---|---|
| KR | 10-2017-0026895 A | 3/2017 |
| WO | WO 2016/047063 A1 | 3/2016 |
| WO | WO 2016/169585 A1 | 10/2016 |

OTHER PUBLICATIONS

Wilaiprasitporn et al., "Preliminary Study of EEG-Based Situational Awareness Assessment While Engaging in Autonomous Driving Simulator", The 8th Japan-Taiwan Workshop on Mechanical Engineering and Aerospace, Nov. 28-29, 2016, Tokyo, Japan.

* cited by examiner

METHODS AND SYSTEMS FOR PREVENTING AN AUTONOMOUS VEHICLE FROM TRANSITIONING FROM AN AUTONOMOUS DRIVING MODE TO A MANUAL DRIVING MODE BASED ON A RISK MODEL

TECHNICAL FIELD

The present disclosure relates to methods and systems for preventing an autonomous vehicle from transitioning from an autonomous driving mode to a manual driving mode based on a risk model.

BACKGROUND

A vehicle system, such as an automatic driving system, may monitor a physical state of a driver to determine whether a vehicle may be operated in a manual driving mode or an autonomous driving mode. For example, the automatic driving system may use physical observations, e.g., cameras, to assess driver behavior and accommodate for a slow reaction time, attention lapse, drowsiness, intoxication, etc. When the automatic driving system determines that a driver is exhibiting slow reaction times, attention lapses, drowsiness, intoxication, etc., the automatic driving system may modify operation of one or more of the vehicle systems. The driving system, however, may not account for risks that a driver may be willing to take based on a current mental state, as observed through brainwave activity.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

The present disclosure relates to generating a risk assessment profile and determining what risks are associated with allowing a driver to transition from an autonomous driving mode to a manual driving mode based on the risk assessment profile. For example, a system may generate a risk assessment for a driver indicating a mental state of the driver, what risks the driver takes based on the mental state, and under what circumstances such risks are taken, for example. In some aspects, the risk assessment profile may be generated using machine learning algorithms, such that the risk assessment profile may dynamically evolve over time.

After the risk assessment profile has been generated, the system may make a decision whether it is safe to transition the vehicle from an autonomous driving mode to a manual driving mode. For example, the system may determine that a driver may be at an increased risk of driving unsafely based on the user's brainwave activity and eye movements. Based on this analysis, the system may determine that it may not be safe to transition from the autonomous driving mode to the manual driving mode. Furthermore, the system may determine whether to it is safe to transition from the autonomous driving mode to the manual driving mode based on the driver's tendencies/experiences in a given situation. For example, the system may determine whether the driver has experience navigating an intersection with pedestrians, i.e., that the driver is used to maneuvering a vehicle through this type of intersection, and determine what are the risks involved based on previous risks taken by the driver. In other words, based on a current cognitive state of the driver and/or previous driver tendencies/experiences, the system may determine whether the driver would be able to handle the vehicle in a manual driving mode.

BRIEF DESCRIPTION OF THE DRAWINGS

The novel features believed to be characteristic of aspects of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Figure 1:
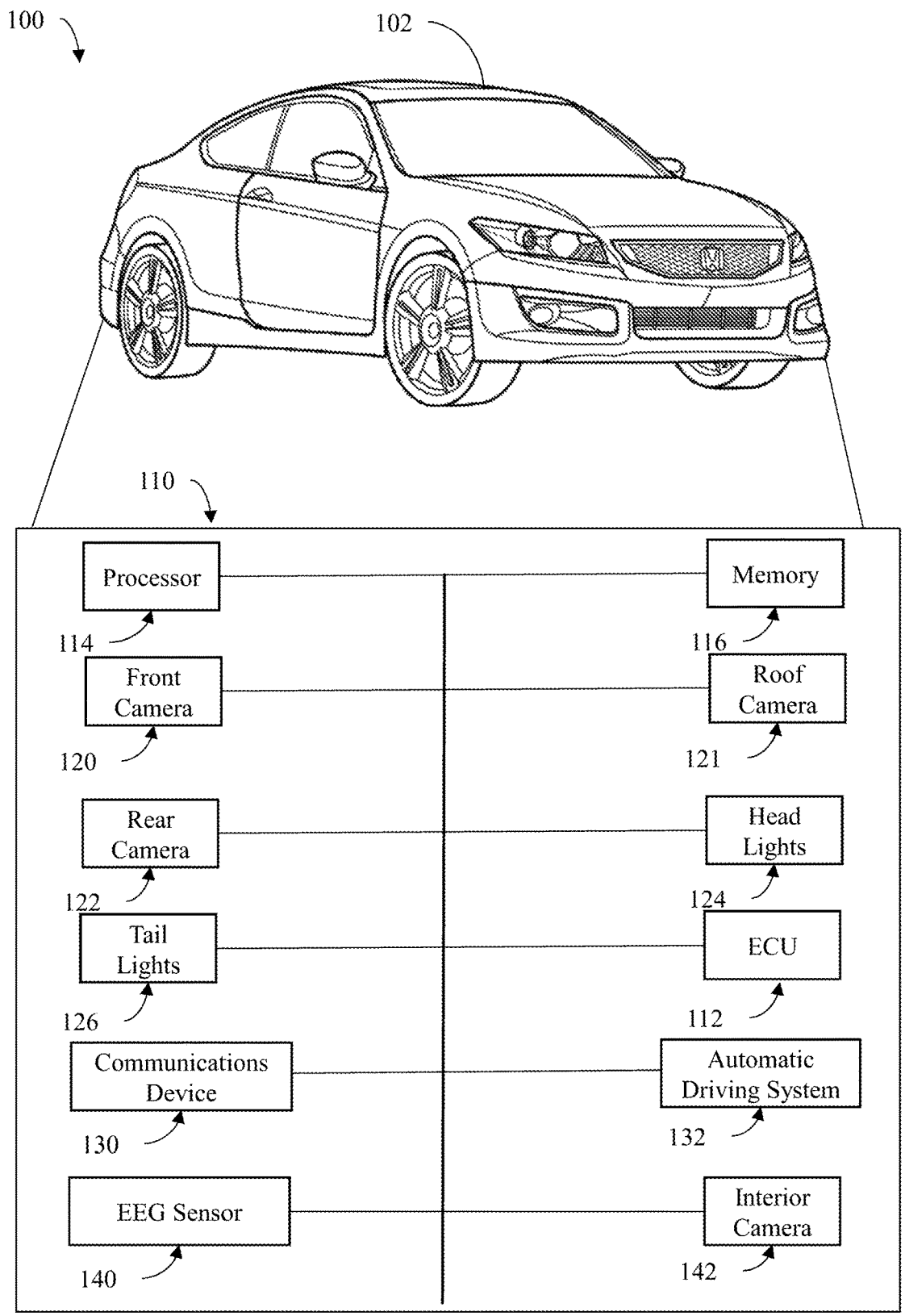
FIG. 1 illustrates a schematic view of an exemplary operating environment of a vehicle system in accordance with aspects of the present disclosure.

Generally described, the present disclosure provides systems and methods for preventing an autonomous vehicle from transitioning from an autonomous driving mode to a manual driving mode based on a risk model. Turning to FIG. 1, a schematic view of an exemplary operating environment 100 of a vehicle system 110 according to an aspect of the disclosure is provided. The vehicle system 110 may reside within a vehicle 102. The components of the vehicle system 110, as well as the components of other systems, hardware architectures, and software architectures discussed herein, may be combined, omitted or organized into various implementations.

The vehicle 102 may generally include an electronic control unit (ECU) 112 that operably controls a plurality of vehicle systems. The ECU 112 may include internal processing memory, an interface circuit, and bus lines for transferring data, sending commands, and communicating with the vehicle systems. The ECU 112 may include an internal processor and memory, not shown. The vehicle 102 may also include a bus for sending data internally among the various components of the vehicle system 110. The vehicle systems may include, but are not limited to, the vehicle system 110, among others, including vehicle HVAC systems, vehicle audio systems, vehicle video systems, vehicle infotainment systems, vehicle telephone systems, and the like.

The vehicle 102 may include head lights 124 and tail lights 126, which may include any conventional lights used on vehicles. The head lights 124 and tail lights 126 may be controlled by the vehicle system 110 and/or ECU 112 for providing various notifications. For example, the head lights 124 and/or tail lights 126 may be activated or controlled to provide desirable lighting when scanning the environment of the vehicle 102. The head lights 124 and tail lights 126 may also provide information such as an acknowledgment of a remote command (e.g., a move request) by flashing.

The vehicle system 110 may also include a front camera or other image-capturing device 120, roof camera or other image-capturing device 121, rear camera or other image capturing device 122, and interior camera or other image capturing device 142 that may each be connected to the ECU 112 and/or an automatic driving system to provide images of the environment surrounding the vehicle 102, as well as images of the driver and/or passengers within the vehicle 102. In some aspects, each of the front camera 120, the roof camera 121, the rear camera 122 may be a digital camera capable of capturing one or more images or image streams, or may be another image capturing device, such as a scanner. The front camera 120 may be a dashboard camera configured to capture an image of an environment directly in front of the vehicle 102. The roof camera 121 may be a camera configured to provide a broader view of the environment in front of the vehicle 102. In further aspects, the interior camera 142 may be may be a digital camera capable of capturing one or more images or image streams, or may be another image capturing device, such as an eye tracker. For example, the interior camera 142 may be a camera configured to track eye movements of the driver, which may be used to determine the driver's intent, as should be understood by those of ordinary skill in the art.

The vehicle system 110 may also include a processor 114 and a memory 116 that communicate with the front camera 120, roof camera 121, rear camera 122, interior camera 142, head lights 124, tail lights 126, communications device 130, and automatic driving system 132. The automatic driving system 132 may include a computer system, as shown with respect to FIG. 3 described below.

The vehicle 102 may further include a communications device 130 (e.g., wireless modem) for providing wired or wireless computer communications utilizing various protocols to send/receive electronic signals internally with respect to features and systems within the vehicle 102 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 130 of the vehicle 102 may be operably connected for internal computer communication via a bus (e.g., a CAN or a LIN protocol bus) to facilitate data input and output between the electronic control unit 112 and vehicle features and systems. In an aspect, the communications device 130 may be configured for vehicle-to-vehicle (V2V) communications, vehicle-to-pedestrian (V2P) communications, and/or vehicle-to-anything (V2X) communications. For example, V2V, V2P, and V2X communications may include wireless communications over a reserved frequency spectrum. As another example, V2V, V2P, and V2X communications may include an ad hoc network between vehicles set up using Wi-Fi or Bluetooth®.

The vehicle 102 may also include one or more electroencephalograph (EEG) sensors 140. In some aspects, the one or more EEG sensors 140 may be placed in the headrest or the roof liner of the vehicle 102, may be worn by the occupants (i.e., a driver and/or one or more passengers) of the vehicle 102, or embedded in the mobile device of the occupants. In some aspects, the one or more EEG sensors 140 may detect the following brainwaves of the occupants: 1) delta brainwaves; 2) theta brainwaves; 3) alpha brainwaves; 4) beta brainwaves; and 5) gamma brainwaves. For example, the one or more EEG sensors 140 may detect delta brainwaves, which operate at a frequency of about 0 to 4 Hz, theta brainwaves, which operate at a frequency of about 4 to 8 Hz, alpha brainwaves, which operate at a frequency of about 8 to 12 Hz, beta brainwaves, which operate at a frequency of about 12 to 40 Hz, and gamma brainwaves, which operate at a frequency of about 40 to 100 Hz. Beta brainwaves may be further divided into three bands; Lo-Beta (e.g., operating at a frequency of about 12-15 Hz), which may be generated while musing; Beta (e.g., operating at a frequency of about 15-22 Hz), may be generated during highly engagement activities; and Hi-Beta (e.g., operating at a frequency of about 22-38 Hz), which may be generated during highly complex thought processes, while integrating new experiences, during times of high anxiety, and/or during times of increased excitement.

In some aspects, delta brainwaves may occur during deep meditation and/or during a dreamless sleep state. Too much delta brainwave activity may be indicative of a brain injury, a learning disability, an inability to think, and/or severe ADHD; whereas, too little delta brainwave activity may be indicative of an inability to rejuvenate the body, an inability to revitalize the brain, and/or poor sleep. An ideal amount of delta brainwaves may promote a healthy immune system, natural healing, and/or restorative/deep sleep.

In other aspects, theta brainwaves may occur during daydreaming and sleep. Theta waves may indicate when an individual experiences/feels deep and raw emotions. In some aspects, too much theta brainwave activity may be indicative of ADHD, depression, hyperactivity, impulsivity, and/or inattentiveness; whereas, too little theta brainwave activity may be indicative of anxiety, poor emotional awareness, and/or excessive stress levels. An ideal amount of theta brainwaves may promote creativity, emotional connection, intuition, and/or relaxation.

In further aspects, alpha brainwaves may occur during calm states, such as, but not limited to during quietly flowing thoughts, and in some meditative states. For example, alpha brainwaves bridge the gap between a person's conscious thinking and subconscious mind, and may help calm down a person down when necessary and promote feelings of deep relaxation. Furthermore, alpha brainwaves generally aid overall mental coordination, calmness, alertness, mind/body integration, and/or and learning. In some instances, when a person is overly stressed, "alpha blocking" may occur, which involves excessive beta brainwave activity, which "blocks" the production of alpha brainwaves due to increased arousal. Too much alpha brainwaves may be indicative of daydreaming, an inability to focus, and/or being too relaxed; whereas, too little alpha brainwaves may be indicative of increased anxiety levels, increased stress levels, insomnia, and/or OCD. An ideal amount of alpha brainwaves may promote relaxation.

In still further aspects, beta brainwaves may occur during a normal state of consciousness, and may generally dominate the waking state of consciousness when attention is directed towards cognitive tasks and the outside world. For example, beta brainwaves may be generated when the driver is actively driving, i.e., alert, attentive, engaged in problem solving, exercising judgment/decision making, and engaged in a focused mental activity. Too much beta brainwaves may be indicative of excessive amounts of adrenaline, increased anxiety, increased arousal, an inability to relax, and/or increased stress levels; whereas, too little beta brainwaves may be indicative of ADHD, daydreaming, depression, and/or poor cognition. An ideal amount of beta brainwaves may promote conscious focus, increased memory, and/or increased problem solving abilities.

In some aspects, gamma brainwaves may be generated while the brain simultaneously processes information from different areas of the brain. Furthermore, in some instances, gamma brainwaves may be generated when in states of love, altruism, etc. Too much gamma brainwaves may be indicative of increased anxiety, increased arousal, and/or increased stress levels; whereas, too little gamma brainwaves be indicative of ADHD, depression, and/or learning disabilities. An ideal amount of gamma brainwaves may promote binding senses, increased cognition, increased information processing abilities, increased learning, increased perception, and/or improved REM sleep.

In some aspects, the automatic driving system 132 may generate a risk assessment profile for determining whether the vehicle 102 should be transitioned from the autonomous driving mode to the manual driving mode. For example, the automatic driving system 132 may generate the risk assessment profile based on the brainwave activity of the driver and/or passengers, eye movements of the driver, learned driving habits of the driver, past cellular device usage of the driver, the type of cellular device being used by the driver, the category of the vehicle 102, and/or technological features included in the vehicle 102.

In some aspects, the brainwave activity measured by the one or more EEG sensors 140 may be provided to the automatic driving system 132, such that the automatic driving system 132 may establish a baseline of brainwave activity of the driver and/or one or more passengers. In some aspects, the baseline brainwave activity may be measured when the driver is in a normal state of mind, i.e., without any external factors influencing the brainwave activity. In other aspects, the baseline activity may be measured each time the vehicle 102 is turned on, and in some aspects, compared against historical baseline brainwave activities to determine a variance from the driver's normal brainwave activity. In this way, the automatic driving system 132 may determine the driver's emotional state upon starting the vehicle. In further aspects, the baseline brainwave activity level may be reevaluated in order to account for changes in the driver's mental state over time, e.g., changes that cause overall anxiety/stress levels to increase/decrease, changes that cause cognition to increase/decrease, etc. In further aspects, the automatic driving system 132 may also filter out physical movements that influence the brainwave activity to determine a baseline mental state of the driver and/or one or more passengers.

In some aspects, the risk assessment profile may be generated by comparing measured brainwave activity while operating the vehicle with the baseline brainwave activity to determine a current mental state of the driver and/or one or more passengers. Furthermore, the automatic driving system 132 may filter out physical movements that influence the brainwave activity while the vehicle 102 is being driven. As a result, the automatic driving system 132 may focus on the mental state of the driver and/or one or more passengers. In this way, as brainwaves change according to what a driver and/or the passenger(s) is feeling, the currently measured brainwaves may be used to determine the mental state of the driver and/or the passenger(s), and based on such, the automatic driving system 132 may determine whether to enable the vehicle 102 to transition from the autonomous driving mode to a manual driving mode. For example, when slower brainwaves are dominant in the currently measured brainwaves, the driver may be tired, slow, sluggish, daydreaming, etc., and as such, the automatic driving system 132 may determine that the driver is at an increased risk of driving unsafely. As another example, when faster brainwaves are dominant in the currently measured brainwaves, the driver may be experiencing increased anxiety and/or stress levels caused by, for example, a distressing phone call taken while driving, and as such, the automatic driving system 132 may determine that the driver is at an increased risk of driving unsafely.

In yet another example, the risk assessment profile may be generated based on a combination of the mental state of the driver and the eye movement of the driver, as captured by the interior camera 142. For example, the automatic driving system 132 may determine that a driver intends to execute unsafe an driving maneuver(s) based on the presence of, for example, faster brainwaves dominating the brainwave activity and the driver eye movement, such as glaring at an object exterior to the vehicle.

In some aspects, when the automatic driving system 132 determines that the driver is at an increased risk of driving unsafely, the automatic driving system 132 may prevent the vehicle 102 from transitioning from the autonomous driving mode to the manual driving mode. However, when the automatic driving system 132 determines that the driver is not at an increased risk of driving unsafely, the automatic driving system 132 may enable the vehicle 102 to transition from the autonomous driving mode to the manual driving mode. That is, the automatic driving system 132 may control the driving mode of the vehicle 102 based on the risk assessment profile.

In other aspects, the automatic driving system 132 may prevent the vehicle 102 from transitioning from the autonomous driving mode to the manual driving mode based on the currently measured brainwave activity of the one or more passengers. For example, the automatic driving system 132 may determine that one or more passengers are experiencing high levels of stress or anxiety due to, for example, weather conditions, unfamiliar driving conditions (e.g., being in a densely populated driving area), road hazards, etc. As such, the automatic driving system 132 may prevent the vehicle 102 from transitioning from the autonomous driving mode to the manual driving mode to provide an increased sense of security to the one or more passengers. Alternatively, the automatic driving system 132 may calculate an average score of the brainwave activity for all of the occupants of the vehicle, including the driver, and determine whether to prevent the vehicle 102 from transitioning from the autonomous driving mode to the manual driving mode based on the average score.

In some aspects, the risk assessment profile may be generated based on driving habits of the driver. For example, the automatic driving system 132 may associate particular driving habits with particular brainwave activity, and develop a driver profile based on the associated brainwave activity. That is, the automatic driving system 132 may monitor the driving habits of the driver when slower brainwaves and/or faster brainwaves are dominant in the currently measured brainwaves and generate a driver profile indicating whether the driving habits pose as an increased risk of driving unsafely when those particular brainwaves are detected. In this way, when similar brainwave activity is measured in the future, the automatic driving system 132 may determine whether the driver is at an increased risk of driving unsafely based on the driver's previous driving habits. Consequently, the automatic driving system 132 may determine whether the vehicle 102 may be transitioned from the autonomous driving mode to the manual driving mode based on the driver profile.

In further aspects, the risk assessment profile may be generated based on prior tendencies of the driver to take risks. For example, the automatic driving system 132 may also monitor driving habits in particular driving situations and the risks exhibited by the driver in those situations, e.g., does the driver attempt to drive through crowded intersections or does driver wait for the intersection to clear? When the driver exhibits a propensity for taking risk in a given driving situation, the automatic driving system 132 may prevent the vehicle 102 from transitioning from the autonomous driving mode to the manual driving mode when the driver is presented with similar driving situations in the future.

In other aspects, the risk assessment profile may be updated over time. For example, the automatic driving system 132 may monitor the driving habits of the driver and update the driver profile over time. That is, the automatic driving system 132 may monitor the driving habits of the driver over time to determine whether the driver is at an increased or decreased risk of driving unsafely. For example, the automatic driving system 132 may monitor the driving habits of a driver from when the driver is young and/or inexperienced, thereby being potentially more prone to driving unsafely, to when the driver is older/experienced, thereby being potentially less prone to driving unsafely. On the other hand, the automatic driving system 132 may monitor the driving habits of the driver with age and the driver's cognitive abilities may be declining, thereby being potentially more prone to driving unsafely. In this way, the risk assessment profile may evolve over time as the driving habits of the driver prove to be more safe or less safe.

Furthermore, in other aspects, the risk assessment profile may also be generated based on the driver's cellular device usage while driving. For example, using the interior camera 142 or the communications device 130, for example, the automatic driving system 132 may also monitor the driver's cellular device usage, including but not limited to, text messaging usage, non-hands free phone usage, and/or social media usage. In some aspects, the automatic driving system 132 may monitor whether the driver is prone to texting/calling/using application(s) while driving, thereby being potentially more prone to driving unsafely; whereas a driver who does not engage in such activity while driving may be potentially less prone to driving unsafely. In some aspects, monitoring the cellular device usage may be achieved by monitoring the physical usage via the interior camera 142 or via V2X communications with the driver's cellular device using the communications device 130. Thus, in some aspects, when the driver may be potentially more prone to driving unsafely due to cellular device usage, the automatic driving system 132 may prevent the vehicle 102 from transitioning from the autonomous driving mode to the manual driving mode.

In addition, in some aspects, the risk assessment profile may also be generated based on the type of cellular device used by the driver. For example, using the communications device 130, the automatic driving system 132 may determine the type of cellular device used by the driver. In some aspects, the automatic driving system 132 may store data related to any number of cellular devices indicating the technologies included within the various cellular devices. In some aspects, the automatic driving system 132 may determine whether the particular cellular device used by the driver includes advanced technologies that may include, but are not limited to, wireless connectivity to the vehicle 102, voice activation and/or driving modes, that do not require physical interaction from the driver, and as such, the driver may be less distracted by their cellular device. And as a result, the driver may be potentially less prone to driving unsafely. In contrast, the automatic driving system 132 may determine that the cellular device is antiquated and may require extensive physical interaction by the driver, and as a result, the driver may be potentially more prone to driving unsafely. In some aspects, when the driver may be potentially more prone to driving unsafely due to the type cellular device used, the automatic driving system 132 may prevent the vehicle 102 from transitioning from the autonomous driving mode to the manual driving mode.

In still further aspects, the risk assessment profile may also be generated based on a category of the vehicle 102. For example, the automatic driving system 132 may determine that the vehicle 102 is a high-performance vehicle and further determine that drivers of such a category of vehicle may be more prone to taking risks while driving. In contrast, the automatic driving system 132 may determine that the vehicle 102 is a "family car," such as a minivan or a less powerful vehicle, and further determine that drivers of such vehicles may be less prone to taking risks while driving. The automatic driving system 132 may also determine whether the driver operates the vehicle 102 in a manner that is typical for the category of the vehicle and update the risk assessment profile when the driver does not operate the vehicle such a manner. In further aspects, the automatic driving system 132 may also adjust the risk assessment profile based on the number or type of passengers in the car. For example, the driver may operate a high performance vehicle 102 more conservatively when other passengers, especially children, are present in the vehicle, or the driver may operate a minivan in an aggressive and dangerous manner when the driver is alone. Thus, it should be understood that the category of the vehicle 102 is not dispositive in determining the risk assessment profile and is only one factor among the factors discussed herein.

Furthermore, the automatic driving system 132 may also generate the risk assessment profile based on technologies included in the vehicle 102. For example, if the vehicle received less highly rated crash test results, lacks extensive V2X communications, such that the vehicle 102 cannot communicate with the driver's cellular device, includes a manual transmission, etc., the automatic driving system 132 may determine that the vehicle 102 increases the risks of unsafe driving when operated in a manual driving mode. To the contrary, if, for example, the vehicle received more highly rated crash test results, includes extensive V2X communications, such that the vehicle 102 communicates with the driver's cellular device, includes an automatic transmission, etc., the automatic driving system 132 may determine that the vehicle 102 decreases the risks of unsafe driving when operated in a manual driving mode.

In addition, in some aspects, the risk assessment profile may also be generated based on risks posed by other vehicles, pedestrians, etc. For example, by using the communications device 130, for example, to perform V2V, V2P, and/or V2X communications, the automatic driving system may determine whether the driver of another vehicle, pedestrian(s), etc., may be distracted in a way (e.g., using a cellular device or distressed as indicated by brainwave activity) that the driver would not otherwise be observable. As a result, the automatic driving system may determine that the vehicles, pedestrians, etc., pose as an increased safety risk, and as such, the automatic driving system 132 may prevent the vehicle 102 from transitioning from the autonomous driving mode to the manual driving mode.

In some aspects, when the automatic driving system 132 prevents the vehicle from being driven in the manual driving mode due to, for example, the mental state of the driver, the automatic driving system 132 may operate the vehicle 102 in a manner similar to the learned driving habits of the driver. For example, if the learned driving habits of the driver include accelerating rapidly when merging onto a highway, the automatic driving system 132 may operate the vehicle 102 in such a manner. In still further aspects, the driver may override the automatic driving system 132 when the transition from autonomous driving to manual driving mode was prevented. For example, the driver may input via a user interface that there is an emergency or other conditions requiring that the driver take control of the vehicle.

In some aspects, the risk assessment profile may be transferred to and stored by a central server. In some aspects, the risk assessment profile may be transferred each time the vehicle 102 is turned off. In further aspects, the risk assessment profile may be transferred at regularly schedule intervals, e.g., once a week, once a month, once a quarter, etc. In still further aspects, the risk assessment profile may be transferred upon request of the driver. By transferring the risk assessment profile to the central server, the risk assessment profile may be further transferred to any vehicle operated by the driver, e.g., another vehicle currently owner or a vehicle purchased in the future.

Figure 2:
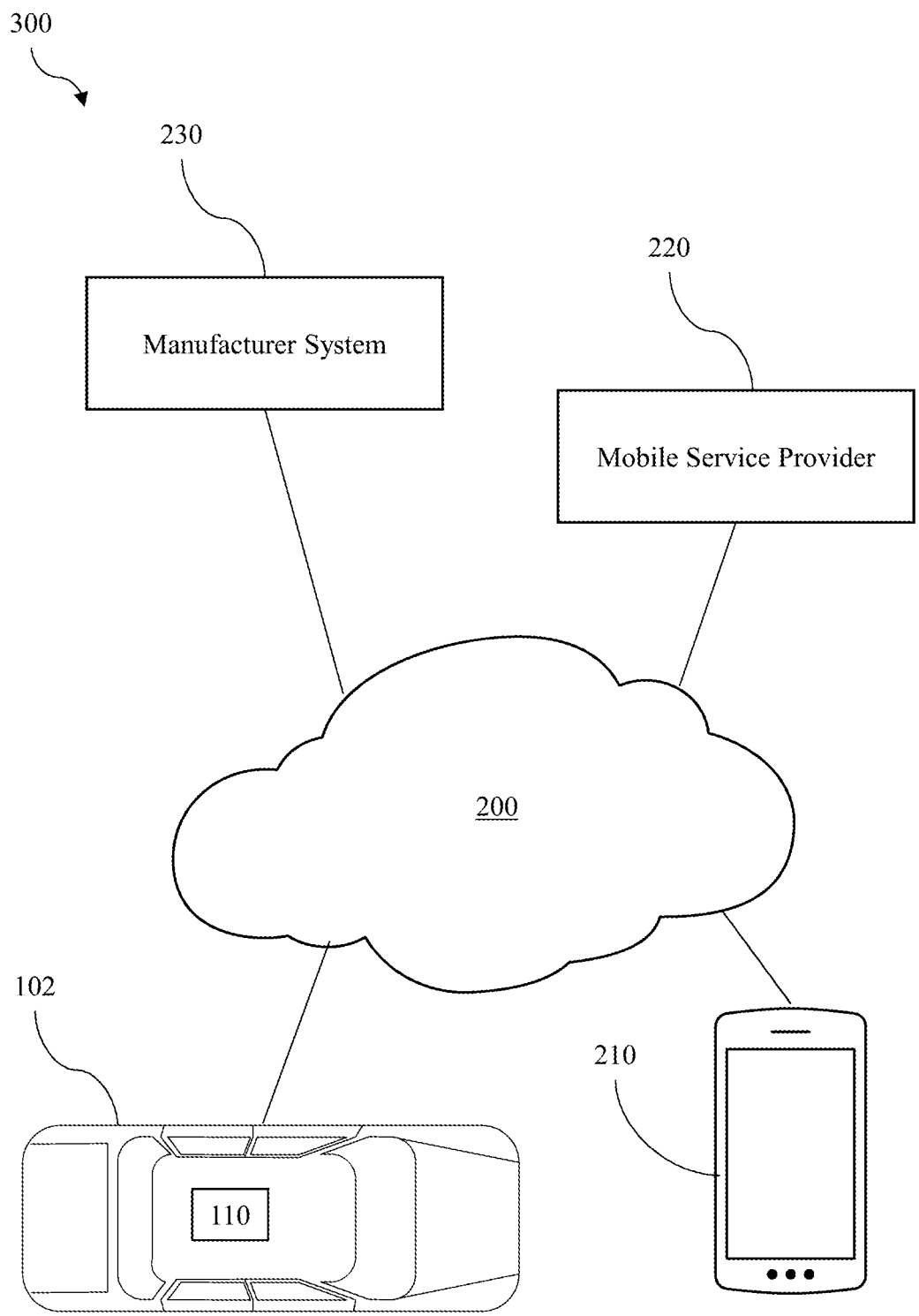
FIG. 2 illustrates an exemplary network for managing the vehicle system.

FIG. 2 illustrates an exemplary network 200 for managing the vehicle system 110. The network 200 may be a communications network that facilitates communications between multiple systems. For example, the network 200 may include the Internet or another Internet Protocol (IP) based network. The network 200 may enable the vehicle system 110 to communicate with a mobile device 210, a mobile service provider 220, or a manufacturer system 230.

The vehicle system 110 within the vehicle 102 may communicate with the network 200 via the communications device 130. The vehicle system 110 may, for example, transmit the risk assessment profile to the manufacturer system 230.

Figure 3:
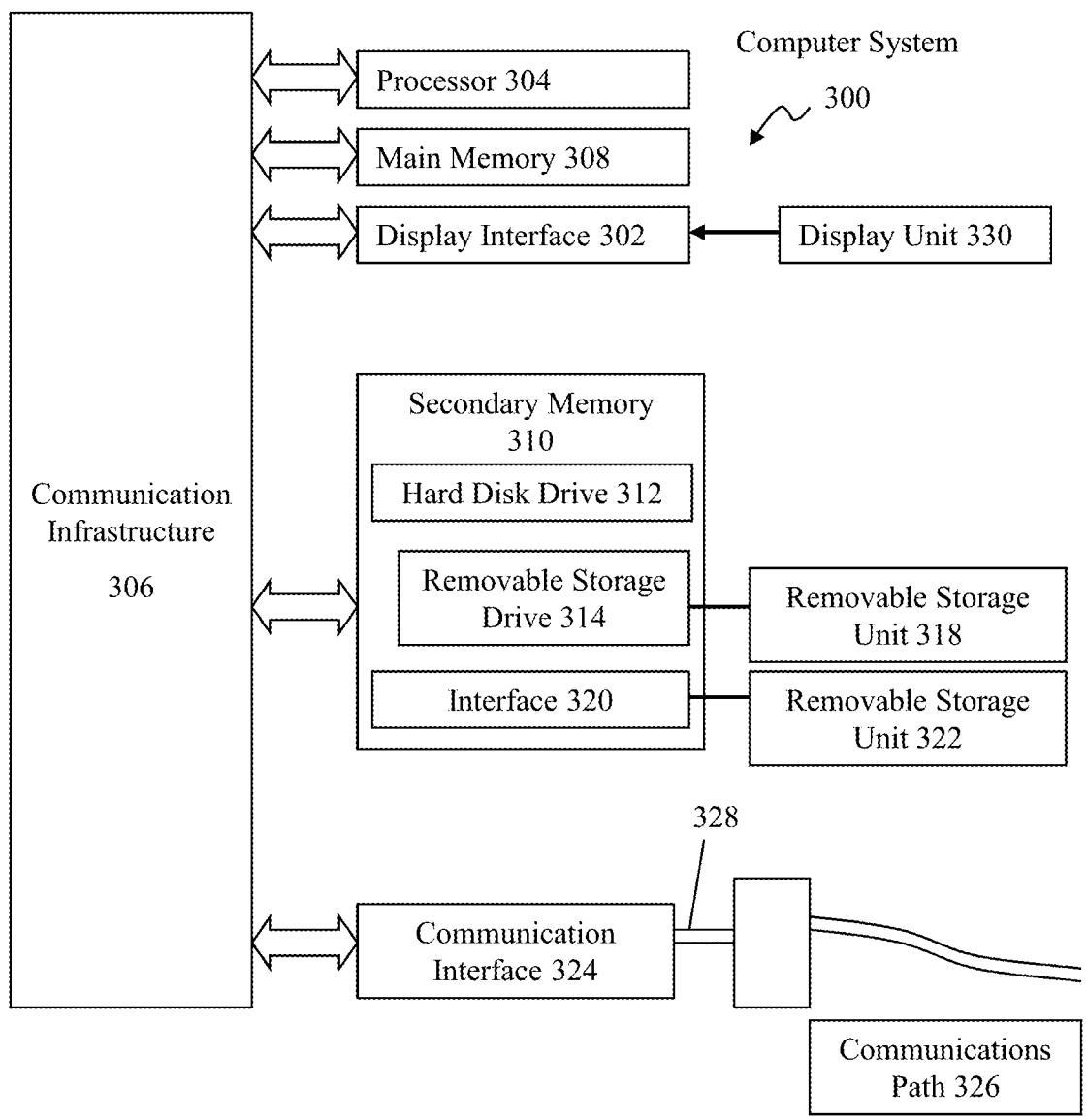
FIG. 3 illustrates various features of an exemplary computer system for use in conjunction with aspects of the present disclosure.

The manufacturer system 230 may include a computer system, as shown with respect to FIG. 3 described below, associated with one or more vehicle manufacturers or dealers. The manufacturer system 230 may include one or more databases that store data collected by the front camera 120, roof camera 121, and/or the rear camera 122. The manufacturer system 230 may also include a memory that stores instructions for executing processes for preventing an autonomous vehicle from transitioning from an autonomous driving mode to a manual driving mode based on a risk model and a processor configured to execute the instructions.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein. An example of such a computer system 300 is shown in FIG. 3.

Computer system 300 includes one or more processors, such as processor 304. The processor 304 is connected to a communication infrastructure 306 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 300 may include a display interface 302 that forwards graphics, text, and other data from the communication infrastructure 306 (or from a frame buffer not shown) for display on a display unit 330. Computer system 300 also includes a main memory 308, preferably random access memory (RAM), and may also include a secondary memory 310. The secondary memory 310 may include, for example, a hard disk drive 312, and/or a removable storage drive 314, representing a floppy disk drive, a magnetic tape drive, an optical disk drive, a universal serial bus (USB) flash drive, etc. The removable storage drive 314 reads from and/or writes to a removable storage unit 318 in a well-known manner. Removable storage unit 318 represents a floppy disk, magnetic tape, optical disk, USB flash drive etc., which is read by and written to removable storage drive 314. As will be appreciated, the removable storage unit 318 includes a computer usable storage medium having stored therein computer software and/or data.

Alternative aspects of the present disclosure may include secondary memory 310 and may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 328, which may be electronic, electromagnetic, optical or other signals capable of being received by communications interface 324. These signals 328 are provided to communications interface 324 via a communications path (e.g., channel) 326. This path 326 carries signals 328 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 318, a hard disk installed in hard disk drive 312, and signals 328. These computer program products provide software to the computer system 300. Aspects of the present disclosure are directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features in accordance with aspects of the present disclosure, as discussed herein. In particular, the computer programs, when executed, enable the processor 304 to perform the features in accordance with aspects of the present disclosure. Accordingly, such computer programs represent controllers of the computer system 300.

In an aspect of the present disclosure where the disclosure is implemented using software, the software may be stored in a computer program product and loaded into computer system 300 using removable storage drive 314, hard drive 312, or communications interface 320. The control logic (software), when executed by the processor 304, causes the processor 304 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 4:
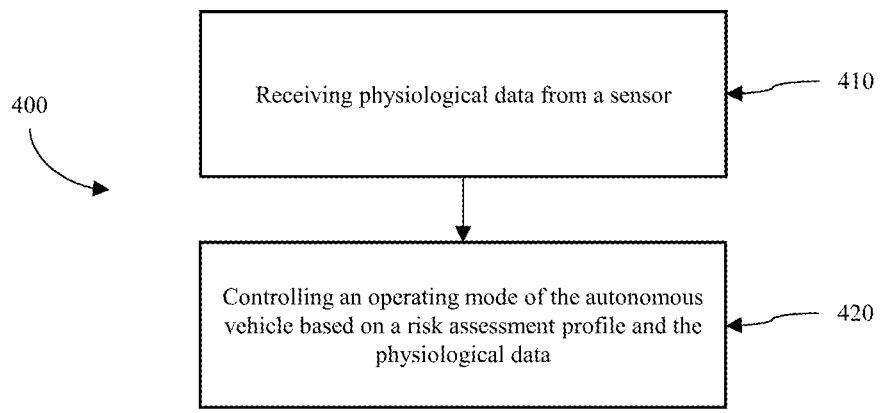
FIG. 4 illustrates a flowchart for preventing an autonomous vehicle from transitioning from an autonomous driving mode to a manual driving mode based on a risk model, according to aspects of the present disclosure.

FIG. 4 illustrates a flowchart for preventing an autonomous vehicle from transitioning from an autonomous driving mode to a manual driving mode based on a risk model, according to aspects of the present disclosure. A method 400 includes receiving physiological data from a sensor 410 and controlling an operating mode of the autonomous vehicle based on a risk assessment profile and the physiological data 420.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. An automated driving (AD) system comprising:
a memory that stores instructions for executing processes for preventing an autonomous vehicle from transitioning from an autonomous driving mode to a manual driving mode based on a risk model; and
a processor configured to execute the instructions, wherein the instructions cause the processor to:
receive physiological data from a sensor comprising an electroencephalograph (EEG) sensor configured to measure brainwave activity of a driver of the autonomous vehicle,
filter the physiological data to remove data affected by one or more physical movements that influence the brainwave activity of the driver,
generate a risk assessment profile based on the filtered physiological data by comparing current brainwave activity of the driver with a baseline brainwave activity of the driver to determine a current emotional state of the driver, the baseline brainwave activity being measured when the driver is in a normal emotional state, the risk assessment profile indicating one or more potential driving risks corresponding to the current emotional state of the driver, and
control an operating mode of the autonomous vehicle based on the risk assessment profile.

2. The AD system of claim 1, wherein controlling the operating mode of the autonomous vehicle comprises preventing the autonomous vehicle from transitioning from the autonomous driving mode to the manual driving mode when the current emotional state indicates that the driver is at risk of unsafe driving.

3. The AD system of claim 2, wherein the brainwave activity of the driver is measured each time the autonomous vehicle is turned on and compared against historical baseline brainwave activities to determine a variance from a driver's normal brainwave activity.

4. The AD system of claim 1, further comprising a camera configured to monitor eye movement of the driver, wherein:
generating the risk assessment profile further comprises determining whether the driver is at risk of unsafe driving based on a combination of the current emotional state of the driver and the eye movement; and
controlling the operating mode of the autonomous vehicle comprises preventing the autonomous vehicle from transitioning from the autonomous driving mode to the manual driving mode when the driver is at risk of unsafe driving.

5. The AD system of claim 1, wherein:
the risk assessment profile is further based on based on driving habits of the driver;
generating the risk assessment profile further associating an unsafe driving habit with a particular brainwave activity measured when the unsafe driving habit occurs; and
controlling the operating mode of the autonomous vehicle further comprises preventing the autonomous vehicle from transitioning from the autonomous driving mode to the manual driving mode when brainwave activity associated with the unsafe driving habit reoccurs.

6. The AD system of claim 1, wherein:
the risk assessment profile is further based on a prior experience of the driver; and
controlling the operating mode of the autonomous vehicle further comprises preventing the autonomous vehicle from transitioning from the autonomous driving mode to the manual driving mode in a current driving situation when the driver exhibited unsafe driving habits in the prior experience, the current driving situation being similar to the prior experience.

7. The AD system of claim 1, wherein the instructions further cause the processor to update the risk assessment profile based on changes in driving habits of the driver or changes in the physiological data.

8. The AD system of claim 1, wherein the instructions further cause the processor to store the risk assessment profile in a central server, wherein the stored risk assessment profile is configured to be transferred to another autonomous vehicle.

9. A method comprising:
receiving physiological data from a sensor comprising an electroencephalograph (EEG) sensor configured to measure brainwave activity of a driver of an autonomous vehicle;
filtering the physiological data to remove data affected by one or more physical movements that influence the brainwave activity of the driver;
generating a risk assessment profile based on the filtered physiological data by comparing current brainwave activity of the driver with a baseline brainwave activity of the driver to determine a current emotional state of the driver, the baseline brainwave activity being measured when the driver is in a normal emotional state the risk assessment profile indicating one or more potential driving risks corresponding to the current emotional state of the driver; and
controlling an operating mode of the autonomous vehicle based on the risk assessment profile.

10. The method of claim 9, wherein controlling the operating mode of the autonomous vehicle comprises preventing the autonomous vehicle from transitioning from an autonomous driving mode to a manual driving mode when the current emotional state indicates that the driver is at risk of unsafe driving.

11. The method of claim 10, further comprising:
measuring the brainwave activity each time the autonomous vehicle is turned on; and
comparing the brainwave activity when the autonomous vehicle is turned on against historical baseline brainwave activities to determine a variance from a driver's normal baseline brainwave activity.

12. The method of claim 9, further comprising tracking eye movement of the driver using a camera, wherein generating the risk assessment profile comprises determining whether the driver is at risk of unsafe driving based on a combination of the current emotional state of the driver and the eye movement; and
controlling the operating mode of the autonomous vehicle comprises preventing the autonomous vehicle from transitioning from an autonomous driving mode to a manual driving mode when the driver is at risk of unsafe driving.

13. The method of claim 9, wherein:
the risk assessment profile is further based on based on driving habits of the driver;
the method further comprises generating the risk assessment profile by associating an unsafe driving habit with a particular brainwave activity measured when the unsafe driving habit occurs; and
controlling the operating mode of the autonomous vehicle further comprises preventing the autonomous vehicle from transitioning from an autonomous driving mode to a manual driving mode when brainwave activity associated with the unsafe driving habit reoccurs.

14. The method of claim 9, wherein:
the risk assessment profile is further based on a prior experience of the driver; and
controlling the operating mode of the autonomous vehicle further comprises preventing the autonomous vehicle from transitioning from an autonomous driving mode to a manual driving mode in a current driving situation when the driver exhibited unsafe driving habits in the prior experience, the current driving situation being similar to the prior experience.

15. The method of claim 9, further comprising updating the risk assessment profile based on changes in driving habits of the driver or changes in the physiological data.

16. The method of claim 9, further comprising storing the risk assessment profile in a central server, wherein the stored risk assessment profile is configured to be transferred to another autonomous vehicle.

17. A non-transitory computer-readable storage medium containing executable computer program code, the code comprising instructions configured to cause a processor to:
receive physiological data from a sensor including an electroencephalograph (EEG) sensor configured to measure brainwave activity of a driver of an autonomous vehicle;
filter the physiological data to remove data affected by one or more physical movements that influence the brainwave activity of the driver;
generate a risk assessment profile based on the filtered physiological data by comparing current brainwave activity of the driver with a baseline brainwave activity of the driver to determine a current emotional state of the driver, the baseline brainwave activity being measured when the driver is in a normal emotional state, the risk assessment profile indicating one or more potential driving risks corresponding to the current emotional state of the driver; and
control an operating mode of the autonomous vehicle based on the risk assessment profile by preventing the autonomous vehicle from transitioning from an autonomous driving mode to a manual driving mode when the risk assessment profile indicates that the driver is at risk of unsafe driving.

18. The non-transitory computer-readable storage medium of claim 17, wherein:
the risk assessment profile is further based on based on driving habits of the driver;
generating the risk assessment profile based on the driving habits further comprises instructions configured to cause the processor to associate an unsafe driving habit with a particular brainwave activity measured when the unsafe driving habit occurs; and
controlling the operating mode of the autonomous vehicle further comprises instructions configured to cause the processor to prevent the autonomous vehicle from transitioning from the autonomous driving mode to the manual driving mode when brainwave activity associated with the unsafe driving habit reoccurs.

19. The non-transitory computer-readable storage medium of claim 17, wherein:

the risk assessment profile is further based on a prior experience of the driver; and controlling the operating mode of the autonomous vehicle further comprises instructions configured to cause the processor to prevent the autonomous vehicle from transitioning from the autonomous driving mode to the manual driving mode in a current driving situation when the driver exhibited unsafe driving habits in the prior experience, the current driving situation being similar to the prior experience.

20. The non-transitory computer-readable storage medium of claim 17, wherein the code further comprises instructions configured to cause the processor to update the risk assessment profile based on changes in driving habits of the driver or changes in the physiological data.

* * * * *